June 15, 1937.                P. F. HUGHES, JR                2,084,031
                         TAPE DRAWING ARRANGEMENT
                           Filed July 21, 1934            2 Sheets-Sheet 1

INVENTOR
Peter F. Hughes Jr.
BY
Ward, Crosby & Neal
ATTORNEYS

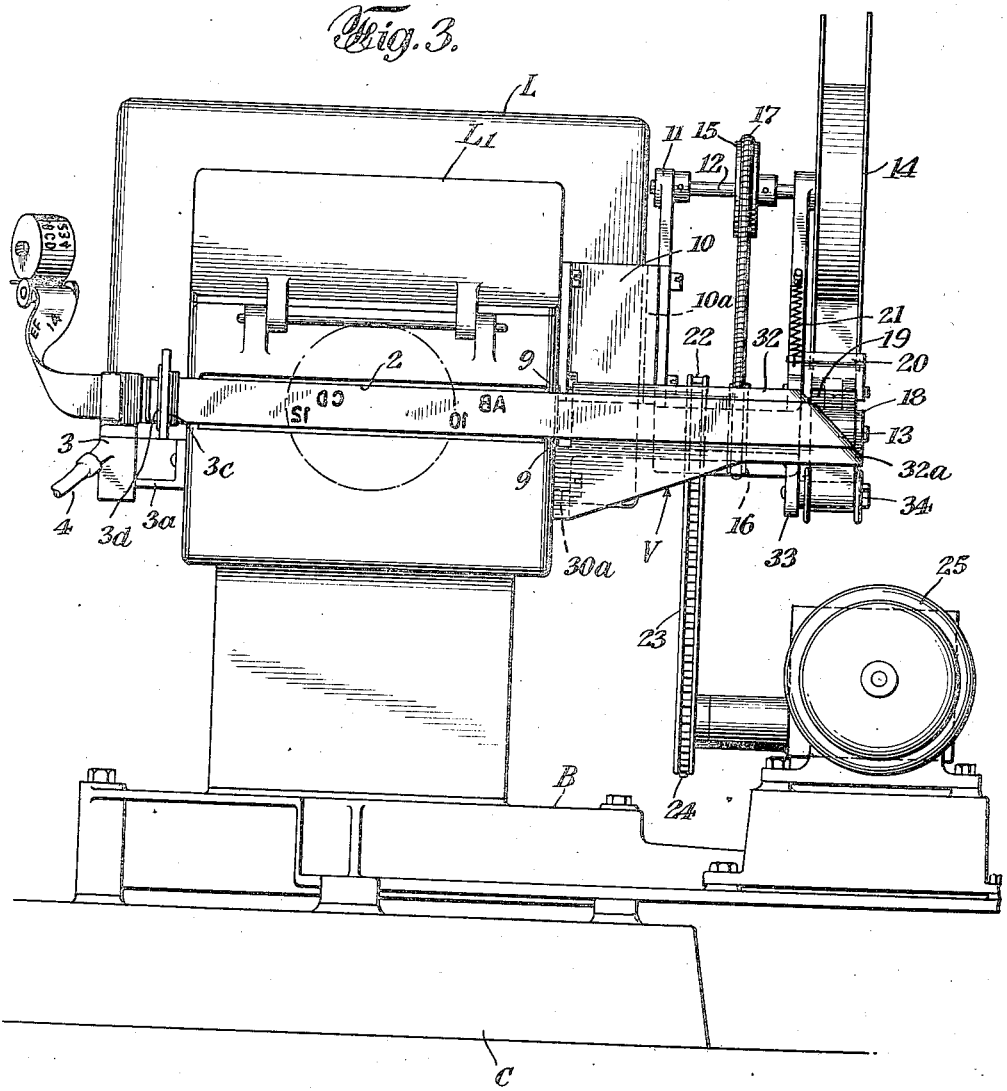
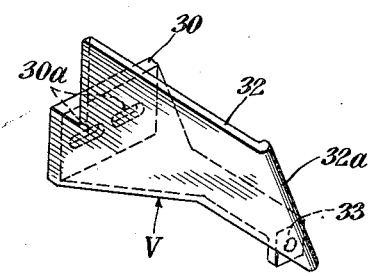
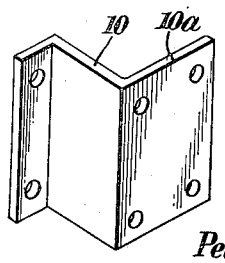

UNITED STATES PATENT OFFICE 2,084,031

TAPE-DRAWING ARRANGEMENT

Peter Francis Hughes, Jr., Rahway, N. J., assignor to Trans-Lux Daylight Picture Screen Corporation, New York, N. Y., a corporation of Delaware Application July 21, 1934, Serial No. 736,308

9 Claims. (Cl. 271—2.1)

My invention relates to a tape-drawing and reeling arrangement operative to draw a tape through a projection field and thereafter to wind the tape upon a reel.

In accordance with my invention, the tape is turned more or less at right angles to the path taken thereby while moving through the projection field and, while disposed flatwise, is engaged by the tape-drawing roller and thereafter wound upon the aforesaid reel.

Various other objects, advantages and characteristics of my invention will become apparent from the following description.

My invention resides in the tape-drawing arrangement, features and combinations of the character hereinafter described and claimed.

For an understanding of my invention and for an illustration of one of the forms thereof, reference is to be had to the accompanying drawings, in which:

Fig. 3 is a front elevational view of the projector mechanism and associated tape-drawing mechanism;

Fig. 4 is a perspective view of a tape-guiding member; and

Fig. 5 is a perspective view of a supporting bracket.

Figure 1:
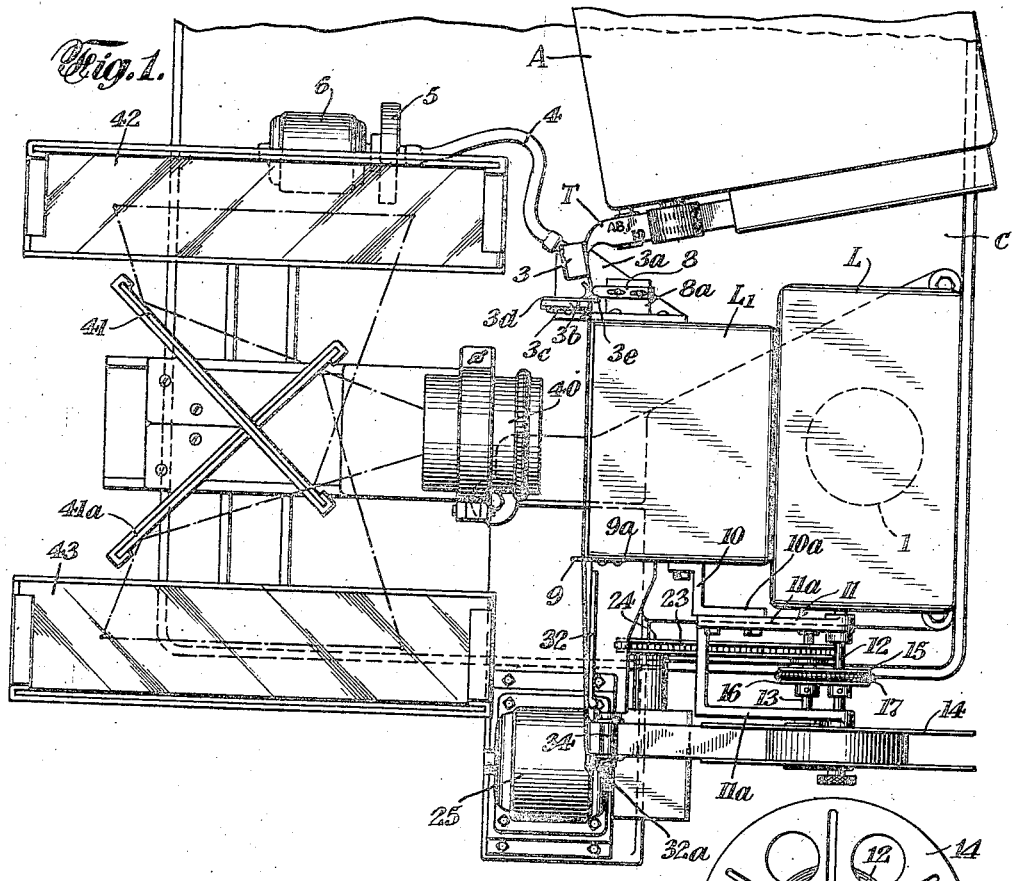
Figure 1 is a plan view of a projection system through which a tape is drawn by the mechanism of my invention.

Referring particularly to Fig. 1, A represents a conventional ticker mechanism which functions to print characters lengthwise of a tape T which is ejected from said ticker mechanism flatwise with the printed surface of the tape facing upwardly. As shown, a support C is provided for the entire mechanism and, on this support, there is mounted a base B which carries the projector and the tape-drawing mechanism.

Figure 2:
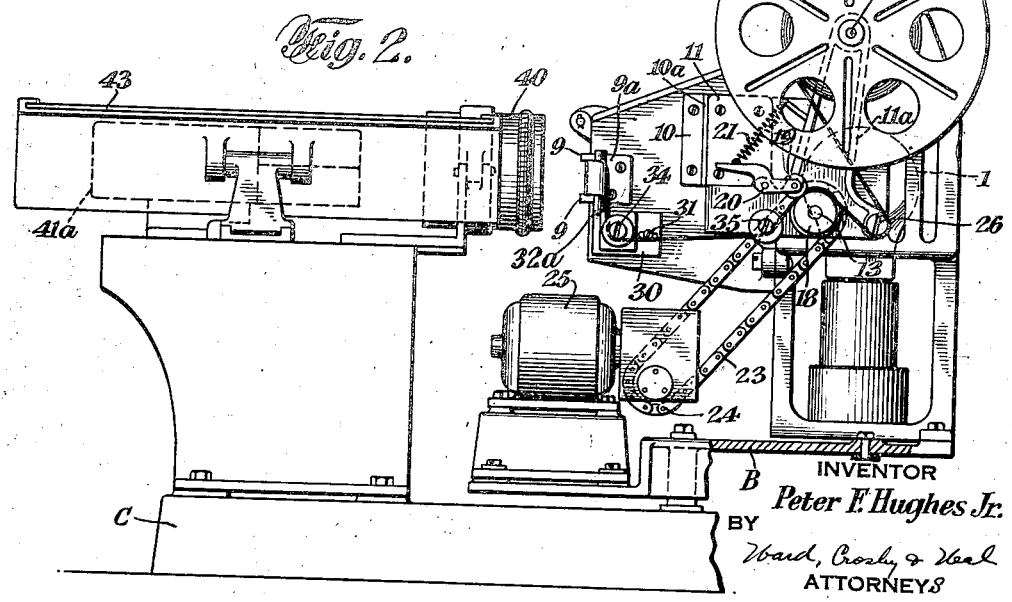
Fig. 2 is an end elevational view of the arrangement shown in Fig. 1.

The projector comprises a lamp housing L and a lens housing L1, the lamp housing having disposed therein a suitable lamp l serving to horizontally direct from right to left, Fig. 2, the projecting light beam which traverses a suitable condenser lens arrangement, not shown, but disposed in said lens housing L1. The front vertical wall of the lens housing L1 is provided with a horizontal passage 2, Fig. 3, which defines the projection field of the projector mechanism.

As herein shown, the tape T travels horizontally with respect to the aforesaid projection field with its plane maintained in a vertical plane. In this respect, the mechanism illustrated is of the same general character as disclosed in U. S. Letters Patent No. 1,908,960 and, in accordance with the disclosure of said Letters Patent, an air chamber 3 is disposed between the ticker mechanism and the projector, said air chamber being supported on a bracket 3a secured to the adjacent vertical wall surface of the lens housing L1 and said air chamber having a face with which the tape T is adapted to coact. This face of the chamber 3 is provided with an air port, not shown, adapted to be more or less closed by the tape, this action depending upon the length of the tape loop which is formed by the tape immediately after it leaves the ticker mechanism. As shown, the chamber 3 has a conduit 4 leading therefrom, this conduit being connected to a housing 5 in which a fan rotor is mounted. A continuously operating electric motor 6 is connected to the fan rotor whereby air is withdrawn from the chamber 3 along the conduit 4.

The aforesaid bracket 3a comprises a vertical upstanding member 3b, Fig. 1, opposite sides of which carry the respective members 3c and 3d, these members terminating in curved end sections against which the tape is adapted to ride. As shown, the member 3d terminates in a pair of pins 3e spaced vertically one above the other a distance slightly greater than the width of the tape T, said pins serving to guide said tape in a vertical plane just prior to entrance thereof into the projection field. As clearly appears, the tape, before insertion between the pins 3e, is given a twist through an angle of ninety degrees to thereby form a twisted tape loop between the ticker mechanism and the projection field, this twisted tape loop coacting with the face of the air chamber 3.

A suitable braking member 8 such, for example, as a bar mounted for limited sliding movement on a bracket extension 8a is biased in any suitable manner from right to left, Fig. 1, whereby the tape is held against the curved end section of the member 3d with some degree of pressure, this arrangement being provided so that the tape may be drawn through the projection field in a regular and uniform manner.

At the exit end of the projection field, a pair of pins 9 spaced vertically one above the other are disposed in horizontal alinement with the respective pins 3e, the pins 9 being carried by a bracket 9a suitably secured to the adjacent vertical surface of the lamp housing L1. These two sets of pins serve as an arrangement for guiding the tape T, while maintained in a vertical plane, along the horizontal path shown in Fig. 3.

In accordance with the invention, there is utilized a suitable arrangement for supporting the tape-drawing mechanism. To this end, a bracket 10, or equivalent, may be suitably supported in operative position on the vertical wall of the lens housing L1 at the exit end of the projection field. Suitably secured to the vertical plate-like section 10a of said bracket 10 is a frame 11 which comprises the spaced parallel sections 11a, Fig. 1. Journaled in these frame sections 11a are a pair of shafts 12 and 13, the shaft 12, exteriorly of the outer frame section 11a, having a reel 14 suitably secured thereto for rotatable movement therewith. Interiorly of the frame sections 11a, pulleys 15 and 16 are suitably secured to the respective shafts 12 and 13, these pulleys being connected by a belt 17 which, preferably, is of the spring type.

Exteriorly of the outer frame section 11a, the shaft 13 has a roller 18 suitably secured thereto for rotative movement therewith, the peripheral surface of this roller preferably being knurled as indicated in Fig. 3. Coactable with the roller 18 is a supplementary roller 19 mounted on a lever 20 pivoted to said outer frame section 11a, this lever being suitably biased in a clockwise direction, as by a spring 21, whereby the supplementary roller 19 is constantly thrust toward the roller 18.

Interiorly of the frame sections 11a, the shaft 13 has a sprocket wheel 22 suitably secured thereto for rotatable movement therewith. The sprocket wheel 22 is driven by a sprocket chain 23 which engages therewith and which also engages a lower sprocket wheel 24 mounted on a shaft which is suitably geared to the armature of an electric motor 25 or the like suitably supported on the aforesaid base B.

To place the apparatus in condition for operation, it will readily be understood that the tape T is disposed between the coacting rollers 18 and 19, the tape thereafter extending partly around an idler roller 26 supported by the frame section 11a and then being wound upon the reel 14. The tape is held in engagement with the roller 18 by the biased roller 19 and, therefore, when said roller 18 is rotated by the motor 25 in a clockwise direction, Fig. 2, it results that the tape is drawn in a direction from left to right, Fig. 2. Inasmuch as the path of the tape in the direction last noted is at right angles to the course taken by said tape while passing through the projection field, it results that the direction of movement of the tape, after it leaves the projection field, is necessarily changed.

In accordance with my invention, an arrangement is provided for changing the path of tape movement in a highly satisfactory and efficient manner. To this end, I provide a tape-deflecting member V such, for example, as illustrated in Fig. 4. This tape-deflecting member comprises a bracket section 30 provided with a pair of elongated, horizontal slots 30a through which extend the respective screws 31 securing said bracket section 30 to the vertical wall of the lens housing L1 at the exit side of the projection field. The tape-deflecting member V further comprises a vertical section 32 having a plane, exterior face, said vertical section rising from a horizontal section 33 of said tape-deflecting member. As clearly appears from a consideration of Fig. 1, the aforesaid section 32 is disposed in a vertical plane which should be closely adjacent the vertical plane of the tape as the latter moves through the projection field.

The above described tape-deflecting section 32 terminates in an inclined edge 32a which may be enlarged and provided with a smooth curved surface if desired. As shown in Fig. 3, the aforesaid edge 32a is inclined downwardly in a direction from left to right.

In operation, the tape T is positioned in the projection field in the manner illustrated and, while maintaining the plane thereof in vertical relation, said tape is disposed flatwise beside the vertical section 32 of the tape-deflecting member V. Thereupon, the tape is turned at right angles and passed over the inclined edge 32a of said member 32, said tape, then, being passed beneath the freely rotatable, spaced rollers 34 and 35, the roller 34 being carried by a depending section 33 of the member V, Fig. 4, and the roller 35 being carried by the frame section 11a. From the roller 35, the tape passes between the rollers 18 and 19 and thence to the reel 14 in the manner hereinbefore described.

As above described, the motor 25, by the sprocket chain 23, operates the tape-drawing roller 18 to pull the tape through the projection field 2, said motor 25, by the spring belt 17, also furnishing the power for rotating the reel 14. Any suitable arrangement may be provided for controlling the motor 25 so that it operates more or less in synchronism with the rate at which tape is ejected by the ticker mechanism A. With the mechanism herein shown, although not necessarily, the motor controlling arrangement may be of the character illustrated in the aforesaid U. S. Letters Patent No. 1,908,960 in which case, the varying suction effect in the chamber 3, as determined by the extent to which the tape T covers the suction port thereof, is utilized for operating a switch mechanism which opens and closes the circuit of said motor 25.

An especially advantageous feature of my invention resides in the fact that the tape is disposed flatwise rather than in vertical edgewise relation at the time that it comes into engagement with the drawing roller 18. Furthermore, the tape is still disposed flatwise at the time that it is wound upon the reel 14. For these reasons, the plane of the reel 14 may be disposed vertically rather than horizontally and the tape-drawing arrangement may be disposed relatively close to the lamp and lens housings. This is advantageous because economizing on space requirements and further because the tape-drawing operation is more efficiently performed from the practical viewpoint.

The image-producing system per se may be of any suitable character. As herein disclosed, such system is of the general character disclosed in Curtis application Serial No. 460,571, filed June 12, 1930 which issued as U. S. Letters Patent No. 2,051,593, on August 18, 1936 and, therefore, the projecting light beam, after it traverses the tape section in the projection field 2, passes through an objective lens 40. Thereafter, the projecting light beam coacts with the crossed mirrors 41, 41a which serve to produce two independent light beams, one being so directed as to engage the mirror 42 and the other being adapted to engage the mirror 43. These mirrors 42 and 43 direct the respective light beams upwardly for contact with other mirrors, not shown, by which said light beams are directed, respectively, into engagement with a pair of screens which may face, for example, into different rooms whereby duplicate images of the same tape character may be observed by different groups of people. In lieu of an objective lens and light-reflecting system of the character just described, it is to be understood that a projection system of any other suitable character may be provided and that such system may be utilized to project images to a single screen or a plurality of screens as may be desirable. As herein shown, the objective lens 40 together with the mirrors 41, 41a, 42 and 43 are suitably supported on a bracket 44 which may be carried by the aforesaid support C.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a system of the character described, means defining a substantially horizontal path for the passage of a character-bearing tape through a projection field, means for changing the course of said tape after passage through said projection field so that it passes along a second path disposed substantially at right angles with respect to said first named path while maintained approximately horizontal, and tape-drawing means positioned to coact with said tape while it passes along said second path.

2. In a system of the character described, means defining a path for the passage of a character-bearing tape through a projection field, means for directing the tape, after passage therethrough said projection field, in substantially a horizontal direction along a path positioned substantially at right angles to said projection field, tape-drawing means positioned in said path for drawing the tape through said projection field, and a reel upon which the tape is wound after passage beyond said tape-drawing means.

3. In a system of the character described, means defining a path for the horizontal passage of a character-bearing tape through a projection field with the plane of the tape disposed in a vertical plane, and means for maintaining the tape flatwise while passing the same along a path disposed transversely to said projection field.

4. In a system of the character described, means defining a path for the horizontal passage of a character-bearing tape through a projection field with the plane of the tape disposed in a vertical plane, and means for directing the tape along a path disposed substantially at right angles to said projection field after passage of the tape therethrough, said tape being maintained flatwise while passing along said path.

5. In a system of the character described, means defining a path for the horizontal passage of a character-bearing tape through a projection field with the plane of the tape disposed in a vertical plane, means for directing the tape along a path disposed substantially at right angles to said projection field after passage of the tape therethrough, said tape being maintained flatwise while passing along said path, and means positioned in said path for drawing the tape through said projection field.

6. In a system of the character described, means defining a path for the horizontal passage of a character-bearing tape through a projection field with the plane of the tape disposed in a vertical plane, means for directing the tape along a path disposed substantially at right angles to said projection field after passage of the tape therethrough, said tape being maintained flatwise while passing along said path, means positioned in said path for drawing the tape through said projection field, and a reel disposed in a vertical plane for receiving the tape after passage thereof beyond said drawing means.

7. In a system of the character described, means defining a path for the horizontal passage of a character-bearing tape through a projection field with the plane of the tape disposed in a vertical plane, a tape-guiding member projecting longitudinally beyond said projection field, said member terminating in an inclined surface adapted to be engaged by the tape whereby the course thereof is changed, and means for drawing the tape through said projection field and across said inclined surface.

8. In a system of the character described, means defining a path for the horizontal passage of a character-bearing tape through a projection field with the plane of the tape disposed in a vertical plane, a tape-guiding member projecting longitudinally beyond said projection field, said member terminating in an inclined surface adapted to be engaged by the tape whereby the course thereof is changed, an idler roll positioned below said inclined surface, and means for drawing the tape through said projection field, across said inclined surface and beneath said roller.

9. In a system of the character described, means for feeding a character-bearing tape toward a projection field with the plane of the tape disposed substantially horizontally, means defining a path for the passage of said tape through said projection field, means for directing the tape, after passage thereof through said projection field, in substantially a horizontal direction along a path disposed substantially at right angles to said projection field, and tape-drawing means positioned in said last named path for drawing the tape through said projection field.

PETER FRANCIS HUGHES, JR.